Figure 1:
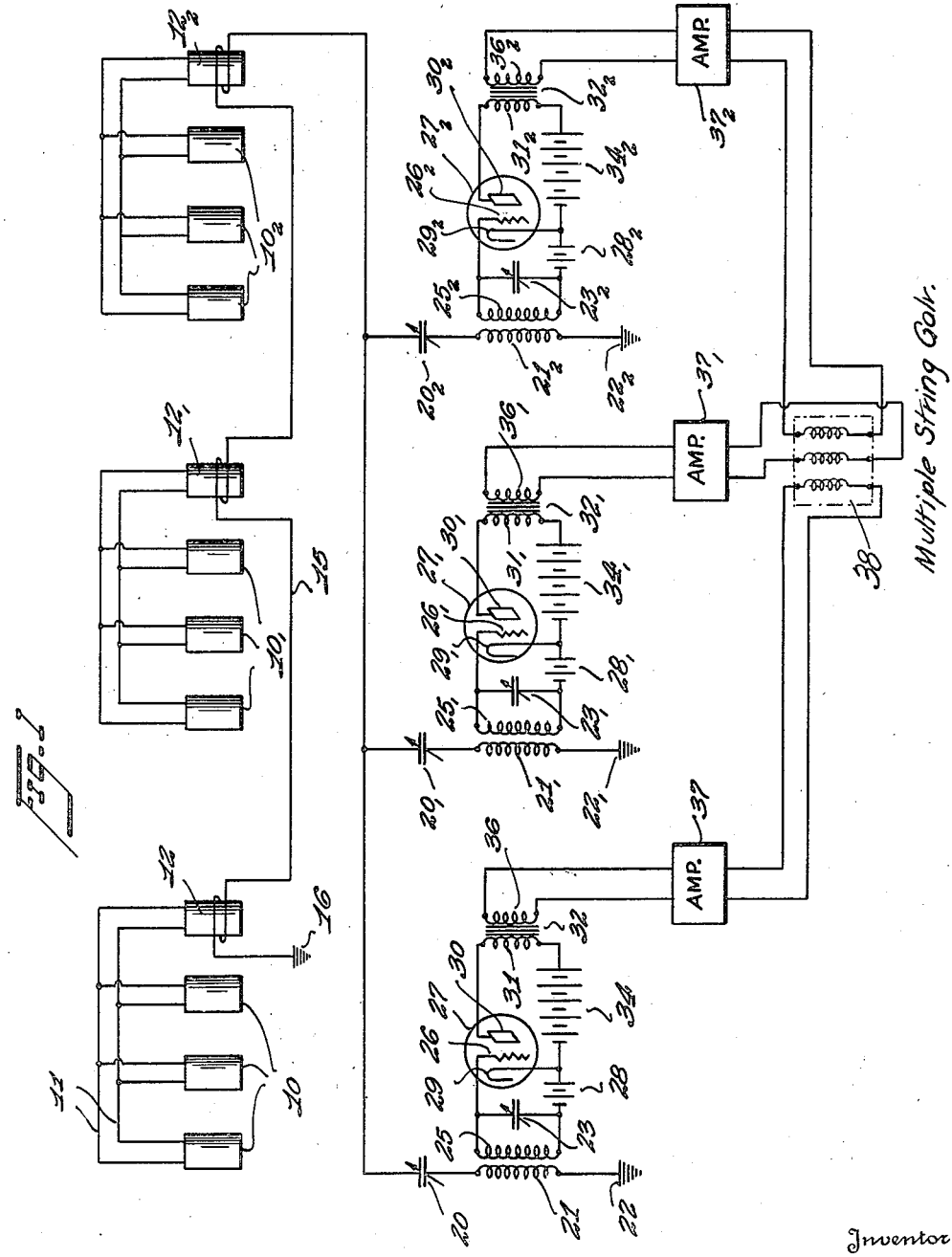

Aug. 4, 1942.   W. R. WELTY   2,291,779
GEOPHYSICAL APPARATUS AND METHOD
Filed May 13, 1940   2 Sheets-Sheet 2

Inventor
William R. Welty
By Watson, Cole, Grindle & Watson
Attorney

UNITED STATES PATENT OFFICE 2,291,779

GEOPHYSICAL APPARATUS AND METHOD

William Robertson Welty, San Antonio, Tex., assignor to Olive S. Petty, San Antonio, Tex.

Application May 13, 1940, Serial No. 334,870

2 Claims. (Cl. 177—352)

This invention relates to seismic apparatus and methods such as may be employed in geological surveying. It is the principal object of the invention to improve and simplify the equipment commonly used for this purpose and to alter the method of use thereof so as to effect a record of seismic impulses which may be more readily interpreted.

It has heretofore been known that reasonably accurate mapping of geological formations can be effected by creating seismic waves at a point or points near the earth's surface and determining at one or more points remote therefrom the lapse of time required to enable the waves to reach such remote points. The customary procedure in such surveying is to fire a charge of explosive at a suitable distance on or at a suitable distance below the surface of the earth at a position commonly referred to as a "shot point," and to detect or receive the resulting direct, reflected, and refracted seismic waves at remote points where they are converted into electrical energy of varying voltage. Suitable apparatus is then employed to record the fluctuations of this electrical energy in permanent form for study.

Conventional equipment for recording the seismic waves includes at the receiving point a device variously called detector, seismograph, seismometer, geophone, or the like. Such an instrument may take as many forms as it has names, and in general comprises a relatively steady mass and a part movable with the earth, these parts supporting electrical elements relatively movable thereby, whereby electric voltages are generated or varied in accordance with variation in the strengths of the respective energizing waves. The electrical output from such a seismometer is customarily amplified with suitable equipment and fed into a recorder which includes a galvanometer having a moving element whose motion, by suitable optical means, is recorded on a photographic sheet caused to move by clockwork at a substantially fixed rate and also to have recorded thereon definite time intervals from an appropriate timer.

It has heretofore been proposed to materially reduce the magnitude of the energy derived from waves propagated generally horizontally by suitable spacing of a plurality of seismometers. For example, if two seismometers are spaced, as measured in the direction of propagation of such waves, by one-half of the wave length thereof, the combined energy output of the two seismometers will be 180° out of phase and will substantially cancel. Such spacing will not materially affect, however, the energy derived from waves which penetrate to a considerable depth and are reflected and/or refracted upwardly, since such waves ordinarily approach the surface in a more nearly vertical direction. In other words, by employing a plurality of seismometers and spacing them in the direction of propagation of the waves which travel in the upper crust, so that their combined energy output will approach zero, the energy derived from such waves is thereby considerably reduced in magnitude with respect to the energy derived from waves reflected and refracted from considerable depths.

It is also proposed to reduce materially the response to random energy, and for this purpose the seismometers need not be spaced in the direction of propagation of the generally horizontal waves. Thus, it is highly unlikely in a system employing a number of seismometers that random energy will be received at the several seismometers in phase, regardless of the arrangement of the seismometers with respect to each other or with respect to the source of seismic impulses. Actually, random energy may affect one only of a group of seismometers, no appreciable response being received at other seismometers of the group, in which event the effect of the random energy will be negligible.

It is customary to employ a considerable number of seismometers, for example, eight or nine, located at different distances from the "shot point," and to separately amplify and record the energy output of these seismometers so that the time of arrival of the seismic impulses at the various points may be determined. In the practice of the present invention each of these seismometers may be replaced with a group of seismometers, the seismometers in each group preferably being spaced as hereinbefore indicated and having their energy output combined.

The use of multiple cables or many separate cables for connecting the several seismometers with suitable amplifying and recording apparatus is common in existing practice. Thus the signal energy received at the seismometer is quite feeble, and in order to establish a favorable ratio between signal energy and extraneous disturbances picked up by the cable, it is usually necessary to increase the energy level at the seismometer by employing one or more thermionic valves. These valves are often supplied with anode voltage and current for cathode heaters from the main amplifying and recording station, with resultant multiplication of the number of conductors. When, as is customary, a considerable number of seismometers is employed, the handling and laying of the cables is a matter of considerable difficulty and the cables are expensive.

It is therefore a further object of the instant invention to materially reduce the number of conductors required and to facilitate the connection of the same to the respective seismometers.

More specifically, it is an object of the invention to provide a system for seismic surveying in which only one cable need be employed, the cable being inductively, directly, capacitatively, or otherwise coupled with the seismometers in series, for example by looping the cable around each seismometer in succession. Such an arrangement not only facilitates coupling of the seismometers with the amplifying and recording equipment, but permits the use of seismometers which can be much more easily sealed to exclude dirt and moisture, no direct electrical connection between the exterior and the interior of the casing being required, in the absence of direct connections for grouping several seismometers.

A further object of the invention is to provide a seismometer for geological surveys having incorporated therein means for converting seismic impulses into electrical wave-form energy, and for transmitting such energy by induction to the exterior of the seismometer.

A further object of the invention is to provide a plurality of such seismometers, each transmitting a modulated wave-form electrical signal having a distinctive carrier frequency, and for thereafter isolating the several carrier frequencies, and separately detecting and recording the modulation energy thereof.

Figure 2:
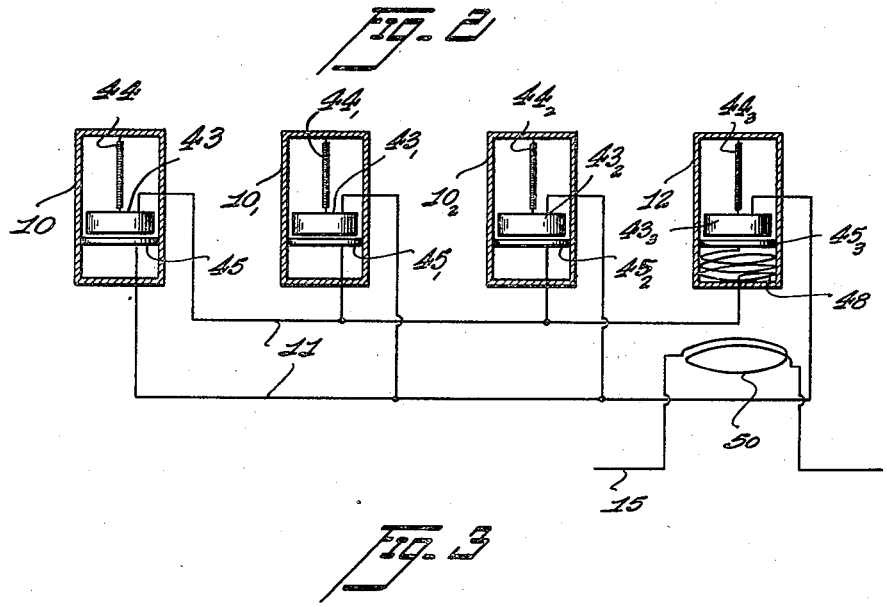
Figure 3:
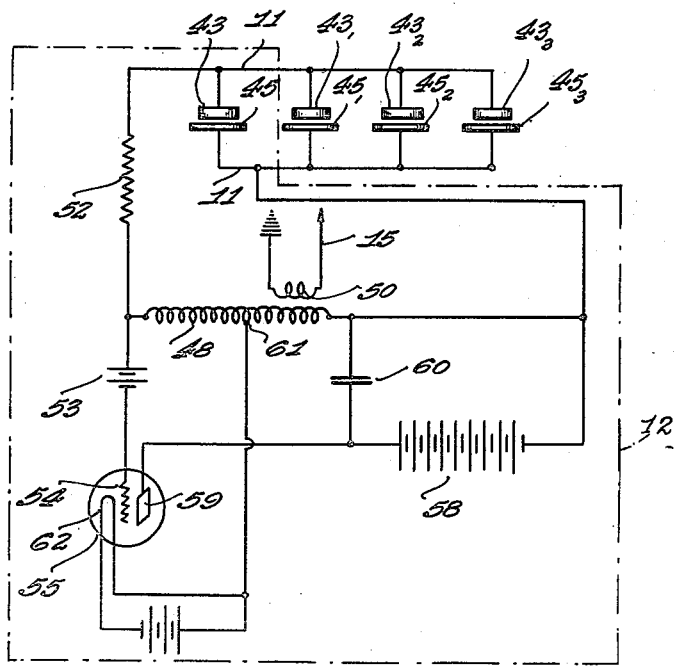

Further objects and features of the invention will be apparent from the following description taken in connection with the accompanying drawings, in which Figure 1 is a diagrammatic view illustrating the grouping of the seismometers and showing the circuits for isolating, detecting, and amplifying the transmitted signals;

Figure 2 is a diagrammatic representation of the seismometers in one group, showing the inductive coupling between one of the seismometers and the transmission line, but omitting other elements of the transmitting circuit; and Figure 3 represents a form of transmitting circuit suitable for use in the transmitting seismometers shown in Figures 1 and 2.

In order to facilitate an understanding of the invention, reference is made herein to the embodiment thereof illustrated in the drawings and specific language is employed to describe the same. It will nevertheless be understood that no limitation of the invention is thereby intended, and that various other modifications and alterations of the illustrated and described arrangements are contemplated such as embody the principles of the invention and fall within the scope of the claims appended hereto.

Figure 1 of the drawings discloses an arrangement of seismometers in three groups, four seismometers being employed in each group, but it will be understood that a larger number of groups, for example eight or nine, can be successfully employed and that the number of seismometers in any group may be two or more.

Seismometers designated by the numeral 10 may contain nothing more than the usual stationary and movable plates constituting a condenser which is variable in response to received impulses. The plates of the seismometers 10 in each group are connected in parallel to similar movable and fixed plates in the associated seismometer 12, and the latter contains, in addition, means for transmitting a wave-form signal which is modulated in accordance with the vibratory movement of the several movable plates in that seismometer group, as is hereinafter more fully described.

In the form of the invention shown herein, the modulated wave-form signal is transmitted to a suitable insulated conductor 15, this conductor being looped around each of the transmitting seismometers 12 so as to place the conductor in inductive relation with a transmitting coil which is preferably disposed within the seismometers 12. One end of the conductor 15 is grounded as indicated at 16, and the other end feeds the signal to suitable filtering, detecting, amplifying, and recording devices which may be arranged as shown in Figure 1.

Thus, a plurality of filter circuits are shown, the number corresponding to the number of transmitting seismometers 12. For convenience, in describing the filter circuits and other associated elements which are similarly duplicated, the same numerals are employed with suitable subscripts, reference being made hereinafter for convenience only to the numerals. Thus, each filter circuit may include a variable condenser 20 and an inductive winding 21 in series between the conductor 15 and the ground connection, indicated at 22. Each filter circuit is adjusted to resonate at a frequency slightly higher than the carrier frequency of one only of the transmitting seismometers. The winding 21 constitutes the primary of a transformer, the secondary winding, indicated at 25, being connected at one end to the grid 26 of a thermionic valve 27 and at the other end through a source 28 of grid bias voltage to the cathode 29. A variable condenser 23 is arranged in parallel with the secondary winding 25 and is adjusted to cause the circuit to resonate at the desired frequency. The valve 27 is operated as a detector to detect the modulations of the transmitting signal passed by the associated filter circuit, by suitable adjustment of the grid bias voltage 28 or otherwise. The anode 30 of the valve 27 delivers the valve output to the primary winding 31 of a transformer 32, the circuit being completed through a source 34 of anode voltage to the cathode 29. The secondary winding 36 of the transformer 32 is connected through a suitable thermionic valve amplifier 37 to a galvanometer or recording device 38, for example, a multiple string galvanometer of the recording type affording one string for each of the filter circuits, so that a separate record may be made of the signal transmitted by each of the transmitting seismometers.

The function of the seismometers is further illustrated in Figure 2 of the drawings, representing certain of the essential elements of the seismometers of one group of four. Thus, each of the seismometers 10 may contain a movable plate 43, having associated therewith suitable elastic suspension means represented by the spring 44, plate 43 being supported in close proximity to a fixed plate 45, so that the capacity between the plates varies as a function of the seismic impulses which are applied to the seismometers. The plates in the seismometers 10, as well as the corresponding plates in the seismometers 12, are connected in parallel by means of conductors 11 which are preferably of the coaxial cable type, so as to provide, in effect, four variable condensers in parallel. The transmitting circuit, the essential elements of which are shown in Figure 3, is preferably housed in the seismometer 12, but to avoid confusion only the transmitting winding, indicated at 48, is shown in Figure 2. This winding may be placed within the generally cylindrical wall of the seismometer, or may be wound so as to lie on the inner surface of the wall or may otherwise be conveniently disposed for inductive relation with the secondary winding 50, formed by looping the conductor 15 about the exterior of the seismometer. Unless the winding 48 is disposed externally of the seismometer casing, it is of course necessary to form the wall of the seismometer of material which will not shield the winding 48 from the winding 50 or otherwise impair the inductive relation therebetween. For example, the casing may be made of Bakelite or other suitable non-metallic composition. Alternatively, a casing of metallic or other conducting material may be employed provided such material is non-magnetic. In this event it may be desirable to reduce eddy currents by means of the introduction of a non-conducting element.

Turning now to Figure 3, it will be observed that the movable and fixed plates 43 and 45 of the seismometers of one group are shown in parallel with each other and in association with the transmitting circuit embodied in the seismometer 12, the fixed plates 45 being connected to one end of the winding 48, and the movable plates 43 being connected through a resistance 52 to the opposite end of the winding 48 and thence through a source of grid bias potential 53 through the grid 54 of a thermionic valve 55. A source 58 of anode voltage is connected at one end to the anode 59 of the valve 55 and at its other end to the fixed plates 45. A by-pass condenser 60 is shunted across the source 58 to afford a path for high frequency current between the anode and one end of the winding 48. The winding 48 is provided with an intermediate tap 61, which is connected to the cathode 62 of the valve 55. The output winding 50 formed by looping the conductor 15 about the seismometer 12 is shown in inductive relation with the winding 48.

It will be appreciated that the circuit shown in Figure 3 will oscillate at a radio frequency which is dependent upon the characteristics of the various elements of the circuit. The inductances of the two parts of the winding 48, the value of the resistance 52, condenser 60, and other elements of the circuit are appropriately selected to provide a convenient resonance frequency when the plates 43 are in repose, and it will be understood that these constants are so adjusted that the frequency of the oscillating circuits embodied in the several seismometers 12 differ substantially. When seismic impulses are applied to the seismometers 10 and 12 of any one group the capacities of the condensers constituted by the fixed and movable plates 43 and 45 of these seismometers will fluctuate rapidly, with the result that the frequency of oscillation of the associated circuit is correspondingly modified. Frequency modulated oscillating energy is thus applied to the winding 48, and is delivered through the winding 50 and the conductor 15 to the circuits shown in Figure 1. There the signal is filtered as hereinbefore described, and the modulation frequencies are detected, amplified, and delivered to the galvanometer or recording device.

In order to effect substantial cancellation of energy derived by the seismometers included in any one group from waves propagated generally horizontally, it is of course not necessary that the seismometers be arranged in alignment with the direction of propagation of such waves. It is only necessary that the spacing between the seismometers, as measured in such direction, is the required fraction of the wave-length of such waves. Furthermore, accuracy of spacing is not required since the establishment of a substantial phase difference in the energy delivered by the several seismometers of a group, as regards waves travelling in the upper crust, is found to be very helpful, particularly since the energy derived from the deeply penetrating reflected or refracted waves by the several seismometers of a group is usually in phase or nearly so, so that the total response from such waves is increased.

It will be appreciated that signals other than those directly representative of the seismic impulses may be transmitted over the single conducting path. Thus a communicating circuit is often employed between the "shot point" and the recording station for the purpose of transmitting a signal at the instant of firing the charge, and to establish telephonic communication between the two points. Such an arrangement can readily be incorporated in the present system by the allocation to the time break signal of a separate carrier frequency, the latter being modulated in any convenient manner and isolated and detected at the recording station.

It will also be understood that while the inductive coupling described herein between the several seismometers and the transmission line is preferred, other types of coupling may be employed. For example, a capacitive coupling may be established by disposing a lead wire from each seismometer in close proximity to the transmission line, by twisting the lead wire about the transmission line, or otherwise arranging the connection so as to afford the necessary capacitive effect. Obviously a direct connection can be effected between each of the seismometers and the transmission line, and a return transmission line can be employed where the ground resistance is too high.

Frequency modulation offers certain advantages over amplitude modulation, particularly in relative freedom from the effects of extraneous electrical disturbances, but it will be appreciated that the invention is not necessarily limited in this respect and that the use of other types of communication systems are contemplated. Again, while the employment of capacitive seismometers is preferred, various other types, such for example as magnetic seismometers, may often be employed with equally good results. Thus, while a capacitive seismometer furnishes its own modulating and oscillating system, certain features of the invention may be practiced with the use of seismometers of widely varying types by the addition of a modulator and oscillator circuit. Numerous further alterations in circuit details will be apparent to one skilled in the art to which the invention relates.

Having thus described the invention, what is claimed as new and desired to be secured by Letters Patent is:

1. In apparatus for use in seismic surveying, the combination with a plurality of seismometers, each including a casing, means within said casing for converting seismic impulses to electrical wave form signal energy and for establishing a field varying with said energy externally of said casing, amplifying and recording apparatus, and a conductor delivering energy to said last named means, said conductor being looped about the several casings successively for energization solely by the several fields.

2. In apparatus for use in seismic surveying, the combination with a plurality of seismometers, each including a casing having therein means for converting seismic impulses into electrical energy in the form of a modulated carrier wave having a distinctive carrier frequency, and means for establishing a field varying with said energy externally of said casing, a conductor looped successively around each casing for energization solely by the several fields, means fed by said conductor for isolating the several carrier waves, whereby the modulations thereof may be separately detected, amplified, and recorded.

WILLIAM ROBERTSON WELTY.